(12) United States Patent
Wood et al.

(10) Patent No.: US 8,233,089 B2
(45) Date of Patent: Jul. 31, 2012

(54) TELEVISION SYSTEM

(75) Inventors: Kevin Wood, Shipley (GB); James Belford, Shipley (GB)

(73) Assignee: Pace PLC., Shipley (GB)

( * ) Notice: Subject to any disclaimer, the term of this patent is extended or adjusted under 35 U.S.C. 154(b) by 914 days.

(21) Appl. No.: 11/416,774

(22) Filed: May 3, 2006

(65) Prior Publication Data

US 2006/0250522 A1 Nov. 9, 2006

(30) Foreign Application Priority Data

May 4, 2005 (GB) .................................. 0509047.7

(51) Int. Cl.
*H04N 17/00* (2006.01)
*H04N 17/02* (2006.01)
*H04N 9/475* (2006.01)
*G06F 9/00* (2006.01)
*G06F 3/00* (2006.01)
*G06F 3/16* (2006.01)

(52) U.S. Cl. ........ 348/515; 348/180; 348/512; 715/716; 715/723; 715/727

(58) Field of Classification Search .................. 348/180, 348/515, 516, 512; 715/716, 723, 727; 360/18
See application file for complete search history.

(56) References Cited

U.S. PATENT DOCUMENTS

| | | | | |
|---|---|---|---|---|
| 4,394,745 A * | 7/1983 | Menezes et al. | ................. | 386/54 |
| 4,974,178 A * | 11/1990 | Izeki et al. | .................... | 715/202 |
| 5,519,828 A * | 5/1996 | Rayner | ......................... | 715/723 |
| 5,642,171 A * | 6/1997 | Baumgartner et al. | ....... | 348/515 |
| 5,760,767 A * | 6/1998 | Shore et al. | .................... | 715/723 |
| 5,844,600 A * | 12/1998 | Kerr | ............................ | 348/14.12 |
| 5,889,514 A * | 3/1999 | Boezeman et al. | ........... | 715/202 |
| 5,999,173 A * | 12/1999 | Ubillos | ......................... | 715/724 |
| 6,034,679 A * | 3/2000 | McGrath | ....................... | 715/723 |
| 6,188,396 B1 * | 2/2001 | Boezeman et al. | ........... | 715/202 |
| 6,269,122 B1 * | 7/2001 | Prasad et al. | ............. | 375/240.28 |
| 6,320,598 B2 * | 11/2001 | Davis et al. | ..................... | 345/648 |
| 6,414,960 B1 * | 7/2002 | Kuhn et al. | ................... | 370/395.64 |
| 6,452,612 B1 * | 9/2002 | Holtz et al. | .................... | 715/723 |
| 6,469,711 B2 * | 10/2002 | Foreman et al. | .............. | 715/723 |
| 6,480,902 B1 * | 11/2002 | Yuang et al. | ................... | 709/248 |
| 6,618,058 B1 * | 9/2003 | Yasui | ............................. | 715/723 |
| 6,630,963 B1 * | 10/2003 | Billmaier | ...................... | 348/485 |
| 6,654,030 B1 * | 11/2003 | Hui | ................................ | 715/720 |
| 6,654,956 B1 * | 11/2003 | Trinh et al. | ................... | 725/100 |
| 6,710,815 B1 * | 3/2004 | Billmaier et al. | ............. | 348/515 |
| 6,766,363 B1 * | 7/2004 | Rothschild | .................... | 709/219 |

(Continued)

FOREIGN PATENT DOCUMENTS

EP 1463334 A 9/2004

(Continued)

*Primary Examiner* — Brian Yenke

(74) *Attorney, Agent, or Firm* — Head, Johnson & Kachigian, P.C.

(57) ABSTRACT

A method is provided for synchronising visual and audio data for a television system. The television system includes display means for displaying visual data thereon and audio means for allowing audio data to be sounded via said system. The method includes the steps of undertaking one of displaying a visual indicator on said display means or sounding an audio indicator via said audio means and, after a time delay or period of time, undertaking the other of displaying the visual indicator or sounding the audio indicator, the period of time between the display of said visual indicator and the sounding of said audio indicator being adjustable by a user of said television system using synchronisation means.

19 Claims, 1 Drawing Sheet

U.S. PATENT DOCUMENTS

| | | | | |
|---|---|---|---|---|
| 6,836,295 | B1* | 12/2004 | Cooper | 348/515 |
| 6,862,044 | B2* | 3/2005 | Kariatsumari | 348/515 |
| 6,906,755 | B2* | 6/2005 | Lundblad et al. | 348/515 |
| 7,480,008 | B2* | 1/2009 | Kim | 348/515 |
| 7,512,886 | B1* | 3/2009 | Herberger et al. | 715/723 |
| 7,586,544 | B2* | 9/2009 | Han et al. | 348/515 |
| 2003/0112249 | A1* | 6/2003 | Cheng | 345/547 |
| 2003/0122964 | A1* | 7/2003 | Hara | 348/515 |
| 2004/0027369 | A1* | 2/2004 | Kellock et al. | 345/716 |
| 2004/0152055 | A1* | 8/2004 | Gliessner et al. | 434/169 |
| 2005/0054442 | A1* | 3/2005 | Anderson et al. | 463/35 |
| 2006/0127053 | A1* | 6/2006 | Lee | 386/96 |

FOREIGN PATENT DOCUMENTS

| | | |
|---|---|---|
| GB | 2243969 A | 5/1990 |
| GB | 2282929 A | 10/1993 |
| JP | 07222209 A | 8/1995 |

* cited by examiner

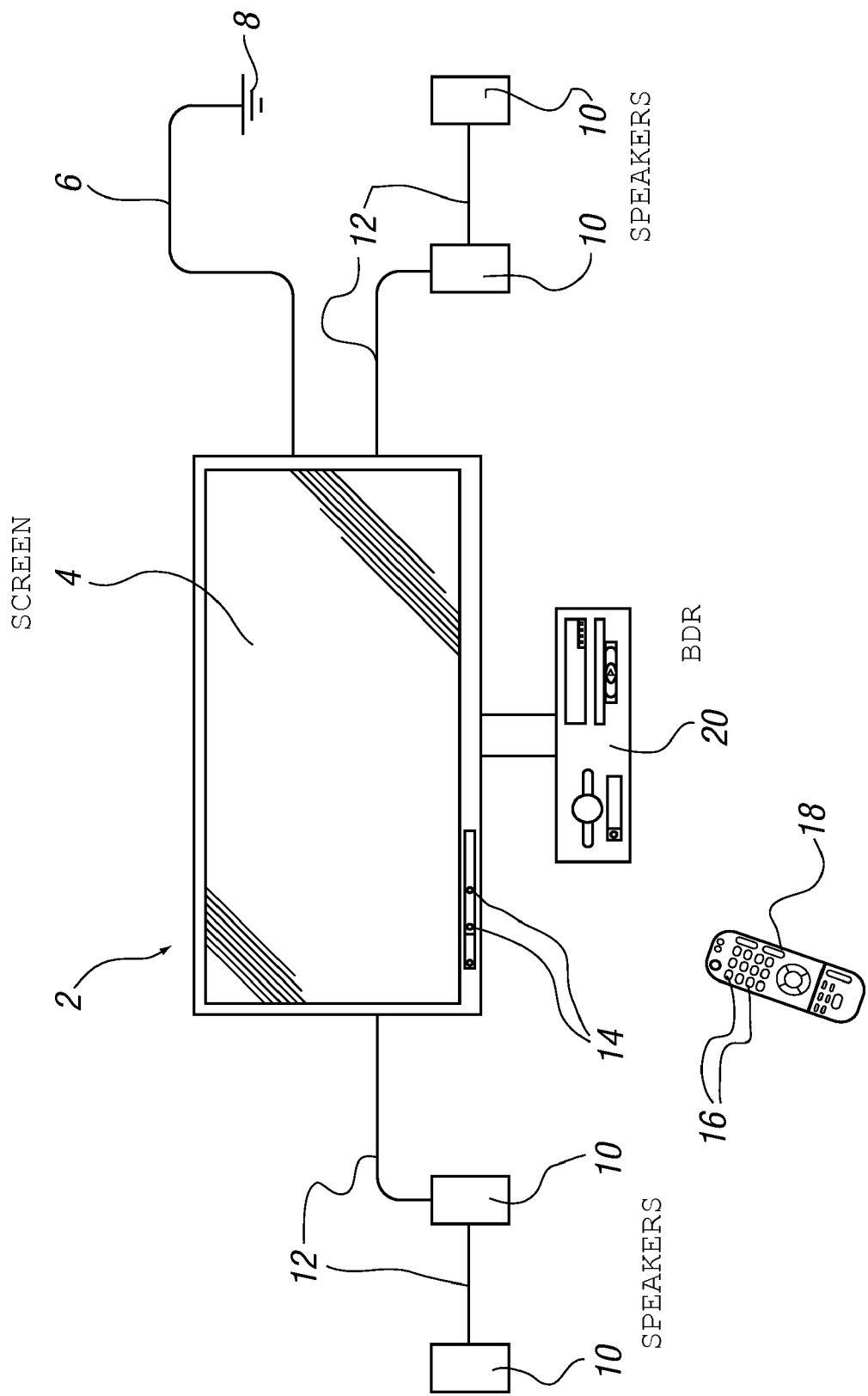

TELEVISION SYSTEM

CROSS REFERENCE TO RELATED APPLICATION

This U.S. patent application entitled "Television System" claims priority to British Application No. 0509047.7 filed 4 May 2005.

STATEMENT REGARDING FEDERALLY SPONSORED RESEARCH DEVELOPMENT (N/A)

INCORPORATED BY REFERENCE OF MATERIAL SUBMITTED ON A COMPACT DISC (N/A)

BACKGROUND OF THE INVENTION

This invention relates to a television system.

Conventionally, television systems include display means, such as a television display screen for allowing visual data to be displayed thereon, such as video, one or more images, text and/or the like, and audio means for allowing audio data to be sounded, such as speech, music, sounds and/or the like. Many flat screen displays, such as plasma screen displays and/or liquid crystal displays (LCD) typically have a lag time of up to 300 ms between the video data being displayed on the screen and the audio data being sounded. This delay results in incorrect "lipsync" and may cause the user some concern and/or give the impression to a user that there is something wrong with the system.

BRIEF SUMMARY OF THE INVENTION

It is therefore an aim of the present invention to provide a television system which overcomes or reduces the problems associated with incorrect lipsync and increases or substantially synchronises the audio and video data being provided via the system.

It is a further aim of the present invention to provide a method of synchronising audio and/or visual data for a television system.

It is a yet further aim of the present invention to provide a broadcast data receiver with synchronisation means.

According to a first aspect of the present invention there is provided a method of synchronising visual and audio data for a television system, said television system including display means for displaying visual data thereon and audio means for allowing audio data to be sounded via said system, and wherein said method includes the steps of undertaking one of displaying a visual indicator on said display means or sounding an audio indicator via said audio means and, after a time delay or period of time, undertaking the other of displaying the visual indicator or sounding the audio indicator, the period of time between the display of said visual indicator and the sounding of said audio indicator being adjustable by a user of said television system using synchronisation means.

Thus, the present invention allows dynamic adjustment of audio and visual data, such as video, in a television system to allow a user to select a required level of synchronisation of the data.

The time period or time delay can be any time period and, in one example, the time delay or time period can be substantially zero and the user can adjust the system to desynchronise the audio and video.

In one embodiment the visual indicator is displayed and then the audio indicator is sounded. In an alternative embodiment the audio indicator is sounded and then the visual indicator is displayed. The synchronisation means can be used to adjust which of the audio or visual indicator events takes place first.

The incoming video and audio data that is received by the television system is typically digital data and includes presentation time stamps (PTS) in the data streams to allow the television system to play the data at the required time. The PTS are typically recognised by an internal system clock. However, with some conventional systems, the audio and video data may still appear out of synchronisation to a user. Thus, the present invention allows the data relating to the time period adjustment as a PTS, to reset a PTS and/or to override a PTS in incoming or stored data streams to allow a user selected level of synchronisation between the audio and visual data of the system. The internal clock system can be located in the television system and/or broadcast data receiver.

The user will typically adjust the period of time between the audio and visual data until substantial synchronisation of the visual and audio indicators is achieved. However, the user could adjust the period of time to achieve less synchronisation if required. Means are provided in the television system to allow adjustment of the time period to be made.

Preferably the visual and audio indicators used in the synchronisation method are independent of and distinguishable from the video and/or audio data receivable by said television system from a remote source, such as a broadcaster (i.e. they can relate specifically to the synchronisation method). The visual and audio indicators are typically stored in memory provided in or associated with the television system or broadcast data receiver.

Preferably one or more on-screen display options are available for selection on the screen to allow the user to increase the time delay or time period, decrease the time delay or time period, set the time delay or time period, cancel the time delay or time period set and/or the like. A visual icon or graphics can be provided on the display screen or an audio signal can be provided to allow a user to determine what level of adjustment of the time period or time delay has been or can still be achieved, preferably within one or more pre-defined ranges, directions, or upper and lower limits. This can appear or sound on selection of the synchronisation method. For example, a time bar can be provided with a cursor or marker means provided thereon, the ends of the time bar representing upper and lower limits of adjustment of the time period or time delay between audio and visual data being displayed currently. The cursor or marker means can be moved b)T the user accordingly.

Adjustment of the time period or time delay and/or selection of the synchronisation method can take place using user input means. The user input means can include any or any combination of a keyboard, one or more cursor keys, joystick, mouse, touch screen display, remote control and/or the like.

Preferably a set up screen option is provided to allow a user to select the synchronisation method or initiate the method. This option is typically selected from a menu display, such as for example a drop down menu display. Once the user has selected the synchronisation method, the visual indicator can be displayed and the audio indicator can be sounded in the relevant order as required.

Preferably the display means is in the form of a plasma display screen or a liquid crystal diode (LCD) screen.

The audio means can form part of the display means or can be separate thereto. For example, the audio means can be remotely located from the display means (i.e. external surround sound system including a plurality of speakers located at spaced apart locations in a room) and can communicate with the display means or other apparatus of the television system, such as an amplifier, via suitable communication means.

The audio indicator is typically in the form of a sound or sounds which is/are audible and recognisable to a user. For example, the sound can be in the form of a bang sound.

The visual indicator is typically in the form of an image, flash of light or colour which appears on the display screen.

The audio and visual indicators are such so as to provide a relatively short event which is easily recognisable or distinguishable by a user and which can provide a clear point or points to allow matching or adjustment of the audio and visual indicators as required. For example, the indicators can have a clear start and end point or the start and end points can be substantially simultaneous.

The visual and/or audio indicators are preferably displayed/sounded repeatedly at pre-determined time intervals once the synchronisation method has been selected or initiated until a user has made the necessary adjustments required or until substantial synchronisation has been achieved. The user can set the frequency at which the indicators are repeated.

Preferably the data relating to the visual and audio indicators is stored in memory in the system. The Central Processing Unit (CPU) of the system processes the adjustment data and, once the user has selected a required level of synchronisation between the audio and visual data, this new user selected data is stored in the memory in the system.

Preferably the time period available for adjustment by a user to set between pre-determined upper and lower limits. For example, between −300 ms and +300 ms.

Preferably a broadcast data receiver, such as a set top box, forms part of the television system. The receiver receives digital data broadcast from a broadcaster at a remote location and decodes and processes the data to form video, audio and/or auxiliary data. The CPU can be provided in the receiver and can be used to control and/or process the synchronisation method, data and/or commands relating to said synchronisation method.

According to a second aspect of the present invention there is provided a television system, said television system including display means for displaying visual data thereon and audio means for allowing audio data to be sounded via said system, and wherein said system includes synchronisation means for allowing a user to adjust one of a visual indicator displayed on said display means or an audio indicator sounded via said audio means relative to the other of said visual or audio indicator.

According to a further aspect of the present invention there is provided a broadcast data receiver, said broadcast data receiver including means for receiving and processing digital data to provide audio, video and/or auxiliary data, said receiver connectable to or including display means for the display of video data thereon and audio means for the sounding of audio data, and wherein said receiver includes synchronisation means for allowing a user to adjust one of a visual indicator displayable on said display means or an audio indicator soundable via said audio means relative to the other of said visual or audio indicator.

DESCRIPTION OF THE DRAWING

An embodiment of the present invention is now described with reference to the accompanying FIG. 1 which displays a television system 2.

DESCRIPTION OF THE PREFERRED EMBODIMENTS

The system includes a flat screen display screen in the form of a plasma screen 4 which has a cable connection 6 to a mains power supply 8. The screen 4 allows the display of visual data thereon, such as video, one or more images, text and/or the like. A plurality of speakers 10 are provided with the television system and can be located both adjacent to and/or remote from display screen 4. The speakers allow the sounding of audio data therefrom, such as for example audio data associated with the visual data being displayed via the display screen 4. The speakers 10 typically communicate with screen 4 or an amplifier forming part of the system via cables 12. One or more functions of the television system can be controlled via control means in the form of a plurality of control buttons 14 provided on screen 4 and/or via buttons 16 on a remote control device 18.

On setting up of the system, a user selects a set up option from an onscreen display menu for allowing synchronisation of audio and visual data for the system. On selection of this option, a flash of light momentarily appears on screen 4 and, after a delay, an audible bang sound is emitted from speakers 10. The user then selects an appropriate button 16 on remote control device 18 to allow the delay between the audio and video indicators (i.e. between the flash and bang) to be reduced. Once this delay has been substantially removed, the synchronisation method is now complete and the settings can be saved and stored in the system. These settings can be used as a PTS, to override an existing PTS and/or to reset a PTS of an incoming data stream or stored data to allow a user selected required level of audio and video synchronisation to be achieved.

A broadcast data receiver (BDR) 20 can form part of the television system and can be integrally formed or connected to the display screen 4. The BDR typically receives digital data from a broadcaster at a remote location via suitable communication means, such as via cable and/or satellite communication, and decodes and processes the data to provide audio, video and/or auxiliary data for sounding via speakers 10 or for display on screen 4. The synchronisation of the audio and visual data can take place via the BDR if required.

Thus, it can be seen that the present invention provides a method and system for adjusting, such as for example reducing, the time period between visual and/or audio data being played through a television system.

While the invention has been described with a certain degree of particularly, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

The invention claimed is:

1. A method of synchronizing visual and audio data for a television system, said method comprising:

receiving and processing digital data from a broadcaster at a remote location to provide video, audio and/or auxiliary data for a television system including a broadcast data receiver, a display for displaying visual data thereon and audio means for allowing audio data to be sounded via said system, the display or audio means television system being a source of delay for displaying the video data or sounding the audio data;

and said method includes the steps of undertaking one of displaying a visual indicator on said display or sounding an audio indicator via said audio means and, after a time delay or period of time, undertaking the other of displaying the visual indicator or sounding the audio indicator, and;

adjusting the period of time between the display of said visual indicator and the sounding of said audio indicator, the period being adjustable by a user of said television system using user synchronization means provided in or controlled by the broadcast data receiver to achieve a time period adjustment setting to synchronize the audio data sounded with the visual data displayed and wherein said time period adjustment setting is used as a presentation time stamp (PTS) to override an existing PTS or to reset a PTS of an incoming data stream received by, or stored data at, the broadcast data receiver to allow a user selected level of synchronization between said visual and audio data and the visual and audio indicators used are independent of, and distinguishable from, the visual and audio data received by said television system from a remote source.

2. A method according to claim 1 wherein the visual and audio indicators are stored in memory forming part of or associated with the television system.

3. A method according to claim 1 wherein the synchronization means includes one or more user selectable on-screen display options.

4. A method according to claim 3 wherein the one or more user selectable on-screen display options allow a user to undertake any or any combination of increase the time period, decrease the time period, set the time period and/or cancel the time period already set.

5. A method according to claim 3 wherein a visual icon or graphics is provided on the display screen on selection of the synchronization method to indicate to the user what level of adjustment of the time period has been made or can still be achieved.

6. A method according to claim 5 wherein the visual icon or graphics includes a time bar with marker means provided thereon, the ends of the time bar representing the upper and lower limits of adjustment of the time period.

7. A method according to claim 6 wherein the marker means is movable by a user between the upper and lower limits.

8. A method according to claim 1 wherein the adjustment means are adjusted by a user using user input means including any or any combination of a keyboard, joystick, mouse, remote control, one or more cursor keys and/or touch screen display.

9. A method according to claim 1 wherein the user selects initiation of the synchronization method from a set up screen option on a menu display.

10. A method according to claim 1 wherein the display means is in the form of a plasma display screen or LCD screen.

11. A method according to claim 1 wherein the audio indicator is in the form of one or more sounds which are audible and recognizable to a user.

12. A method according to claim 11 wherein the audio indicator is in the form of a bang sound.

13. A method according to claim 1 wherein the visual indicator is in the form of a flash of light or color on the display screen.

14. A method according to claim 1 wherein the start and end points of the visual and audio indicators are substantially simultaneous, thereby providing a clear point in time which can allow a user to synchronize the audio and visual indicators together.

15. A method according to claim 1 wherein display and sounding of the visual and audio indicators respectively are repeated at pre-determined time intervals once the synchronization method is initiated until a user saves the selected time period of synchronization or synchronization has been achieved.

16. A method according to claim 1 wherein the time period available for adjustment of the audio and visual indicators is set between −300 ms and +300 ms.

17. A method according to claim 1 wherein the time delay or time period can initially be substantially zero seconds and the adjustment increases the separation of the audio and visual indicators in time.

18. A television system, comprising:
a broadcast data receiver for receiving and processing digital data from a broadcast at a remote location to provide video, audio and/or auxiliary data for said television system;
display means for displaying video data thereon and audio means for allowing audio data to be sounded via said system, and wherein the display means or audio means of the television system is a source of delay for displaying the video data or sounding the audio data and said broadcast data receiver includes synchronization means for allowing user synchronization of said received video or audio data in said television system at said audio means and said display means, said broadcast data receiver synchronization means arranged to allow a user to adjust the period of time between one of a display of a visual indicator generated and displayed on said display means or the sounding means of an audio indicator generated and sounded via said audio means relative to the other of said visual or audio indicator, to achieve a time period adjustment setting and means are provide to cause the time period adjustment setting to be used as a presentation time stamp (PTS) to override an existing PTS and/or to reset a PTS of an incoming data stream received by, or stored data at, the broadcast data receive to allow a user selected level of synchronization between said visual and audio data and the visual and audio indicators are independent of, and distinguishable from, the video and audio data received by said television system from a remote source.

19. A television system according to claim 18 wherein the visual and audio indicators are separated by a time delay or time period prior to adjustment using said synchronization means.

* * * * *